(12) United States Patent
Giri et al.

(10) Patent No.: US 8,974,117 B2
(45) Date of Patent: Mar. 10, 2015

(54) PULSE WIDTH MODULATION OUTPUT DIGITAL TEMPERATURE SENSOR DEVICE

(75) Inventors: Abhik Giri, Baharagora (IN); Saravanan Sadasivan, Bangalore (IN); Manjunath Sreenivasaiah, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 219 days.

(21) Appl. No.: 13/439,344

(22) Filed: Apr. 4, 2012

(65) Prior Publication Data
US 2013/0266041 A1    Oct. 10, 2013

(51) Int. Cl.
*G01K 7/00* (2006.01)
*G01K 7/22* (2006.01)

(52) U.S. Cl.
CPC .......................................... *G01K 7/22* (2013.01)
USPC ........................................................ 374/171

(58) Field of Classification Search
CPC ....... H03M 1/1071; H03M 1/822; G01K 3/00
USPC .................. 374/163, 169–173; 327/124, 175; 341/120
See application file for complete search history.

(56) References Cited

U.S. PATENT DOCUMENTS

| | | | | |
|---|---|---|---|---|
| 4,068,526 A | * | 1/1978 | Goldstein | 374/169 |
| 4,467,616 A | * | 8/1984 | Kitauchi | 62/175 |
| 5,068,777 A | * | 11/1991 | Ito | 363/97 |
| 5,674,008 A | * | 10/1997 | Allinson | 374/183 |
| 5,847,546 A | * | 12/1998 | Sengupta et al. | 320/144 |
| 6,074,089 A | * | 6/2000 | Hollander et al. | 374/181 |
| 6,407,697 B1 | * | 6/2002 | Hager et al. | 342/120 |
| 7,185,500 B2 | * | 3/2007 | Meir | 62/3.2 |
| 7,212,061 B2 | * | 5/2007 | Leung et al. | 327/380 |
| 7,360,947 B2 | | 4/2008 | Krishnamurthy et al. | |
| 7,458,718 B2 | | 12/2008 | Krishnamurthy et al. | |
| 7,637,658 B2 | * | 12/2009 | Gardner et al. | 374/178 |
| 7,651,191 B2 | | 1/2010 | Suzuki | |
| 7,731,417 B2 | * | 6/2010 | Kumagai | 374/1 |
| 2009/0288484 A1 | * | 11/2009 | Selvan et al. | 73/335.02 |

* cited by examiner

*Primary Examiner* — Lisa Caputo
*Assistant Examiner* — Nasir U Ahmed
(74) *Attorney, Agent, or Firm* — Craige Thompson; Thompson Patent Law

(57) ABSTRACT

In one example, a pulse width modulation output temperature sensor device includes a linearization module, an analog-to-digital converter module operatively connected to the linearization module, and a digital magnitude comparator module operatively connected to the analog-to-digital converter module. A binary counter module is also operatively connected to the digital magnitude comparator module. The pulse width modulation output temperature sensor device thereby generates a digital pulse width modulation output based on a temperature sensor reading.

8 Claims, 6 Drawing Sheets

PULSE WIDTH MODULATION OUTPUT DIGITAL TEMPERATURE SENSOR DEVICE

TECHNICAL FIELD

This disclosure relates to temperature sensors, and in particular, to temperature sensors that generate an output signal.

BACKGROUND

One typical requirement in a temperature sensor application is to generate a digital pulse width modulation (PWM) output wherein the duty cycle varies based on the temperature sensed. Various solutions are available either by using a microcontroller, an ASIC, or simply using an analog comparator which compares sensor output with a saw tooth wave. Using an analog comparator is the easiest solution, though it may not ensure high accuracy. Using a microcontroller enables better accuracy, though it requires writing and maintaining software code for the microcontroller.

SUMMARY

Generally, a pulse width modulation (PWM) output digital temperature sensor is disclosed that generates a digital pulse width modulation (PWM) output with a duty cycle that varies based on a temperature reading, and may do so without requiring a processor running software.

In one example, a device includes a linearization module, an analog-to-digital converter (ADC) module operatively connected to the linearization module, and a digital magnitude comparator module operatively connected to the analog-to-digital converter module.

In another example, a pulse width modulation output temperature sensor device includes a linearization module, an analog-to-digital converter module, and a digital magnitude comparator module. The linearization module is configured to receive a temperature signal from a thermistor and to generate a linear output based on the temperature signal. The analog-to-digital converter module is configured to receive the output from the linearization module and to generate a digital signal based on an analog-to-digital conversion of the output from the linearization module. The digital magnitude comparator module is configured to receive the digital signal from the analog-to-digital converter (ADC) module and to generate a digital pulse width modulation output signal based on a comparison of the digital signal from the ADC module to a binary counter module output.

In another example, a method of generating a digital temperature signal includes receiving an analog temperature signal, linearizing the analog temperature signal, and converting the linearized analog temperature signal to a digital signal. The method further includes comparing the digital signal to a binary counter module output, and generating a pulse width modulation (PWM) output signal based on the comparison of the digital signal to the binary counter module output.

The details of one or more examples are set forth in the accompanying drawings and the description below. Other features, objects, and advantages will be apparent from the description and drawings, and from the claims.

DETAILED DESCRIPTION

Figure 1:
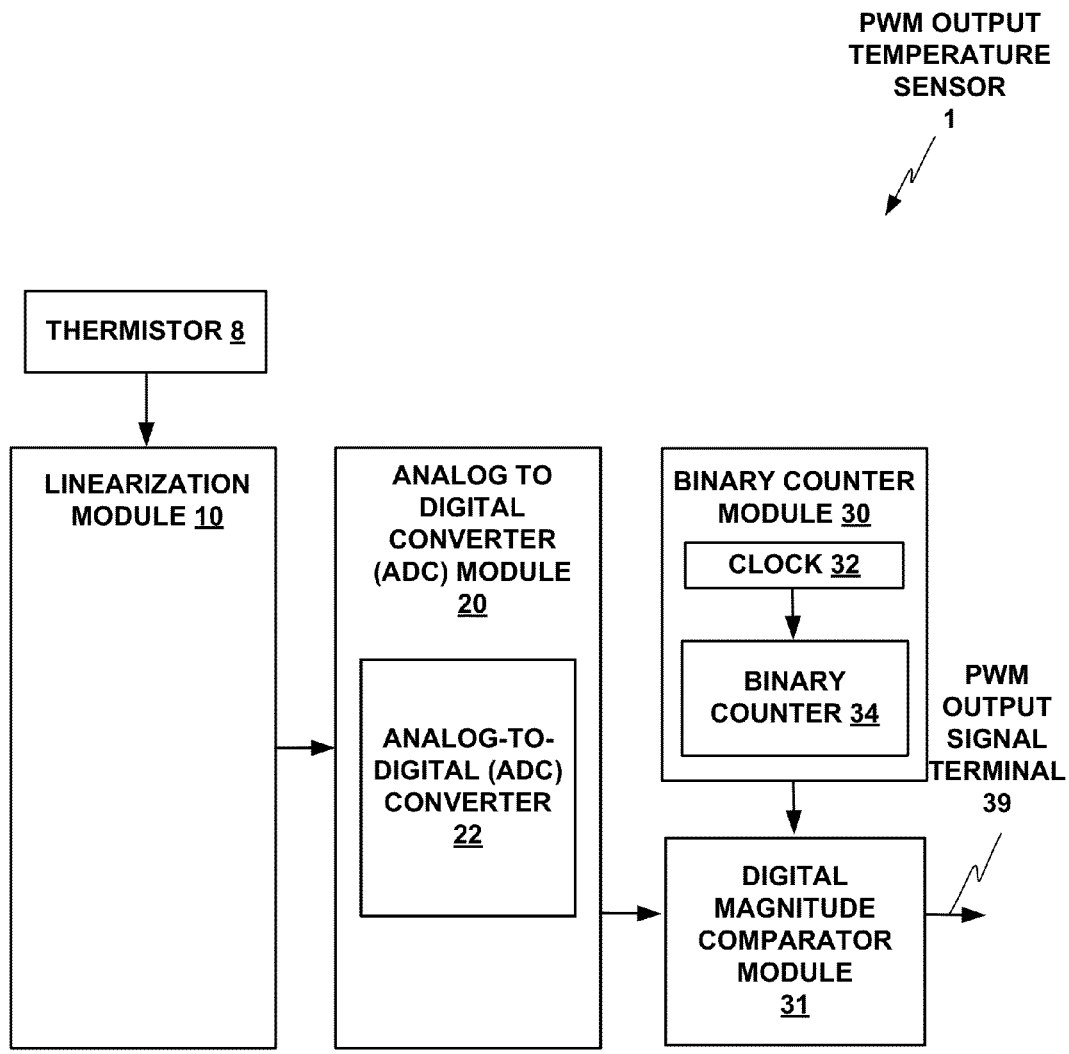
FIG. 1 is a high-level block diagram of a pulse width modulation (PWM) output digital temperature sensor in accordance with an illustrative embodiment.

FIG. 1 is a high-level block diagram of a pulse width modulation (PWM) output digital temperature sensor device 1 in accordance with an illustrative embodiment of this disclosure. PWM output temperature sensor device 1 may include a linearization module 10 connected to an analog-to-digital converter (ADC) module 20, which is connected to a digital magnitude comparator module 31. Binary counter module 30, which includes clock 32 and binary counter 34, is connected to digital magnitude counter module 31. Thermistor 8 is connected to linearization module 10. ADC module 20 includes an analog-to-digital converter (ADC) circuit 22. Digital magnitude comparator module 31, and thereby PWM output temperature sensor device 1 overall, generates a pulse width modulation output signal based on temperature readings of thermistor 8 via PWM output signal terminal 39.

Generally, in this example, temperature sensing thermistor 8 generates an output as a function of temperature. The thermistor 8 may be part of a high temperature sensor for rapidly measuring the temperature of a gas or other fluid. The thermistor 8 is connected to linearization module 10. The linearization module is connected to ADC module 20, which includes analog-to-digital (ADC) circuit 22. The ADC circuit 22 is connected to digital magnitude comparator module 31.

Figure 2:
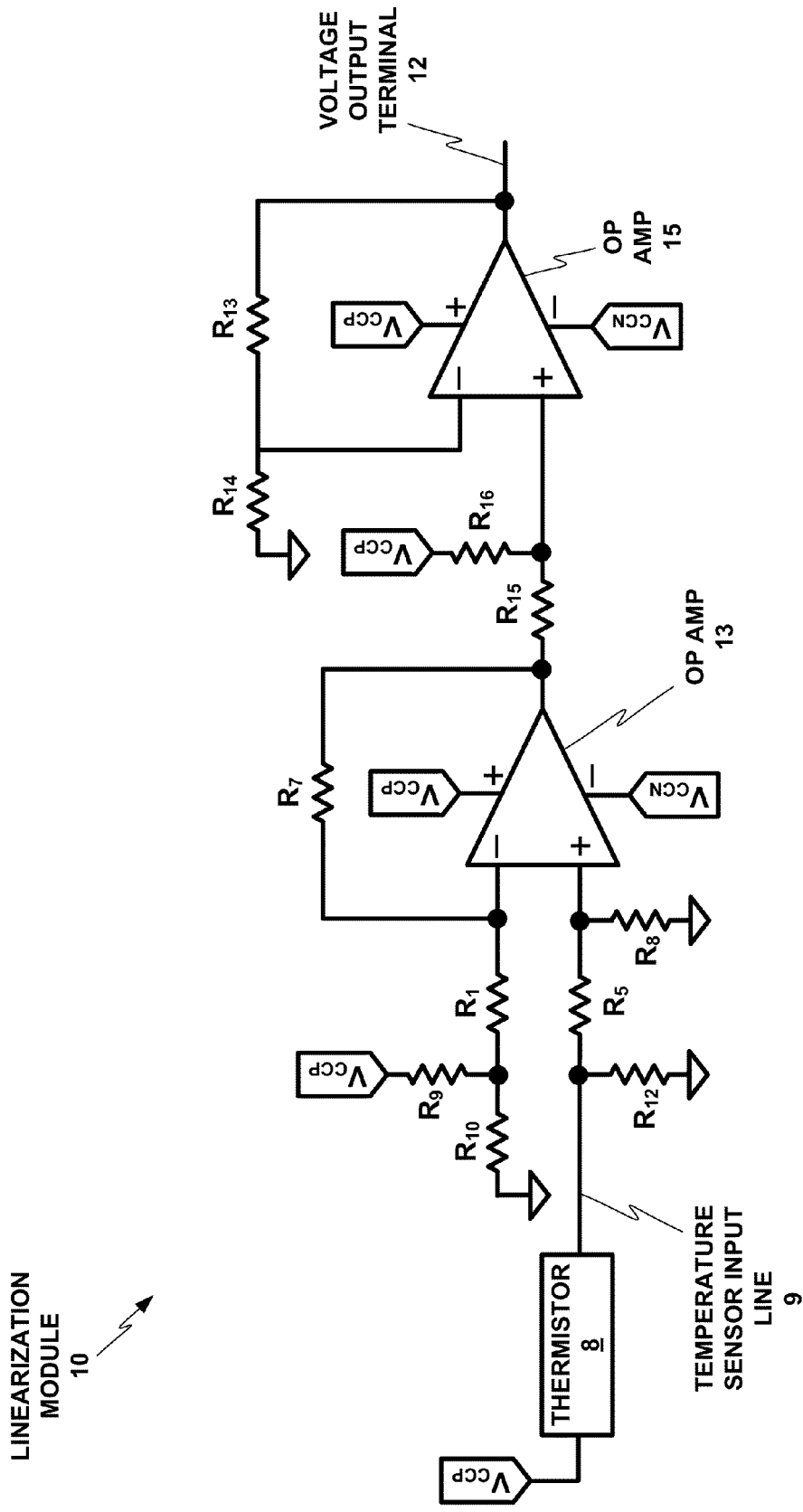
FIG. 2 is a circuit diagram of an example linearization module.

FIG. 2 is a circuit diagram of an example linearization module 10 that is either connected to or includes a thermistor 8. Thermistor 8 is connected to temperature sensor input line 9. In other embodiments, other types of temperature sensors may be connected to temperature sensor input line 9.

Thermistor 8 may comprise a negative temperature coefficient (NTC) thermistor that may be used to sense the temperature of a gas or other fluid with a fast response time in an industrial setting, for example. Linearization module 10 receives the analog temperature reading or signal from thermistor 8 and linearizes this non-linear temperature sensor signal from thermistor 8. Linearization module 10 may generate a voltage output based on the temperature sensor signal from thermistor 8. Linearization module 10 outputs the linearized thermistor signal via voltage output terminal 12 to ADC module 20.

In one illustrative implementation, linearization module 10 may generate an output of 0.0 volts (V) when the temperature input indicates 0 degrees Celsius (° C.), 3.0 V when the temperature input indicates 60° C., and with a linear relationship between these bounds for voltage output corresponding to temperature input.

The relation between temperature reading by thermistor 8 and the voltage output via voltage output terminal 12 may be implemented by circuit elements that may include one or more operational amplifiers and a plurality of resistors, as shown in FIG. 2. The circuit design and the values selected for the resistors may be tuned to linearize temperature readings in a selected operating temperature range into voltage outputs in a selected output voltage range. Various specific implementations may use different resistors having different resistance values used for the resistors in the circuit, to implement a selected relationship between the temperature reading at thermistor 8 and the linear voltage output at via voltage output terminal 12. In a particular implementation of linearization module 10, thermistor 8 may be a negative temperature coefficient (NTC) thermistor with a resistance of 20.0 kilohms at 25° C., and the resistors depicted may have the following values for resistance, in kilohms:

$R_{12}$: 12.5 kΩ
$R_5$: 10.0 kΩ
$R_8$: 10.0 kΩ
$R_{10}$: 1.0 kΩ
$R_9$: 1.0 kΩ
$R_1$: 10.0 kΩ
$R_7$: 10.0 kΩ
$R_{15}$: 10.0 kΩ
$R_{16}$: 29.4 kΩ
$R_{14}$: 10.04 kΩ
$R_{13}$: 4.59 kΩ

Different implementations may include different input ranges, different output ranges, and/or a different linear relationships between the two. For example, in another illustrative implementation, linearization module 10 may respond to a temperature input of −40° C. with a voltage output of 0.0 V and to a temperature input of 125° C. with a voltage output of 5.0 V, with a linear relationship between temperature input and voltage output for the temperature input range between the bounds of −40° C. and 125° C.

As shown in the example of FIG. 2, linearization module 10 includes operational amplifiers 13 and 15. In this example, operational amplifier 13 has its non-inverting input line connected, through a resistor, to the output of thermistor 8 via the temperature sensor input line 9. Operational amplifier 15 also has its non-inverting input line connected, through various intervening circuit elements including operational amplifier 13 and two resistors, to the output of thermistor 8 via the temperature sensor input line 9. Various nodes connected to other circuit elements are also included in the circuit path between temperature sensor input line 9 and the non-inverting input lines of operational amplifiers 13 and 15.

Each of the resistors shown in FIG. 2 may be connected, either directly or through other intervening circuit elements, to at least one of a non-inverting input, an inverting input, or an output of at least one of the one or more operational amplifiers 13 and 15. Linearization module 10 also includes various connections, through appropriate resistors, to positive voltage $V_{CCP}$ and ground. Operational amplifiers 13 and 15 are also connected to positive voltage $V_{CCP}$ and negative voltage $V_{CCN}$ as their power supply. Thermistor 8 is also connected to positive voltage $V_{CCP}$.

Resistor $R_7$ is directly connected between the output and the inverting input of operational amplifier 13, and resistor $R_{13}$ is directly connected between the output and the inverting input of operational amplifier 15, thereby setting the required gain to operational amplifiers 13 and 15. The voltage output terminal 12 is connected directly to the output line of operational amplifier 15. Both operational amplifiers 13 and 15 thereby act in series to amplify and linearize the temperature reading signal from thermistor 8.

The various resistors and the operational amplifiers 13 and 15 as shown in FIG. 2 are thereby configured to generate a voltage in a selected voltage range at the output terminal that linearly represents a temperature signal corresponding to a selected temperature range received from thermistor 8 at the temperature sensor input line 9. The voltage output from linearization module 10 is thereby a linearized, analog voltage signal based on the original analog temperature reading by thermistor 8. Linearization module 10 feeds its voltage output via voltage output terminal 12 to analog-to-digital converter (ADC) circuit 22 of ADC module 20.

Figure 3:
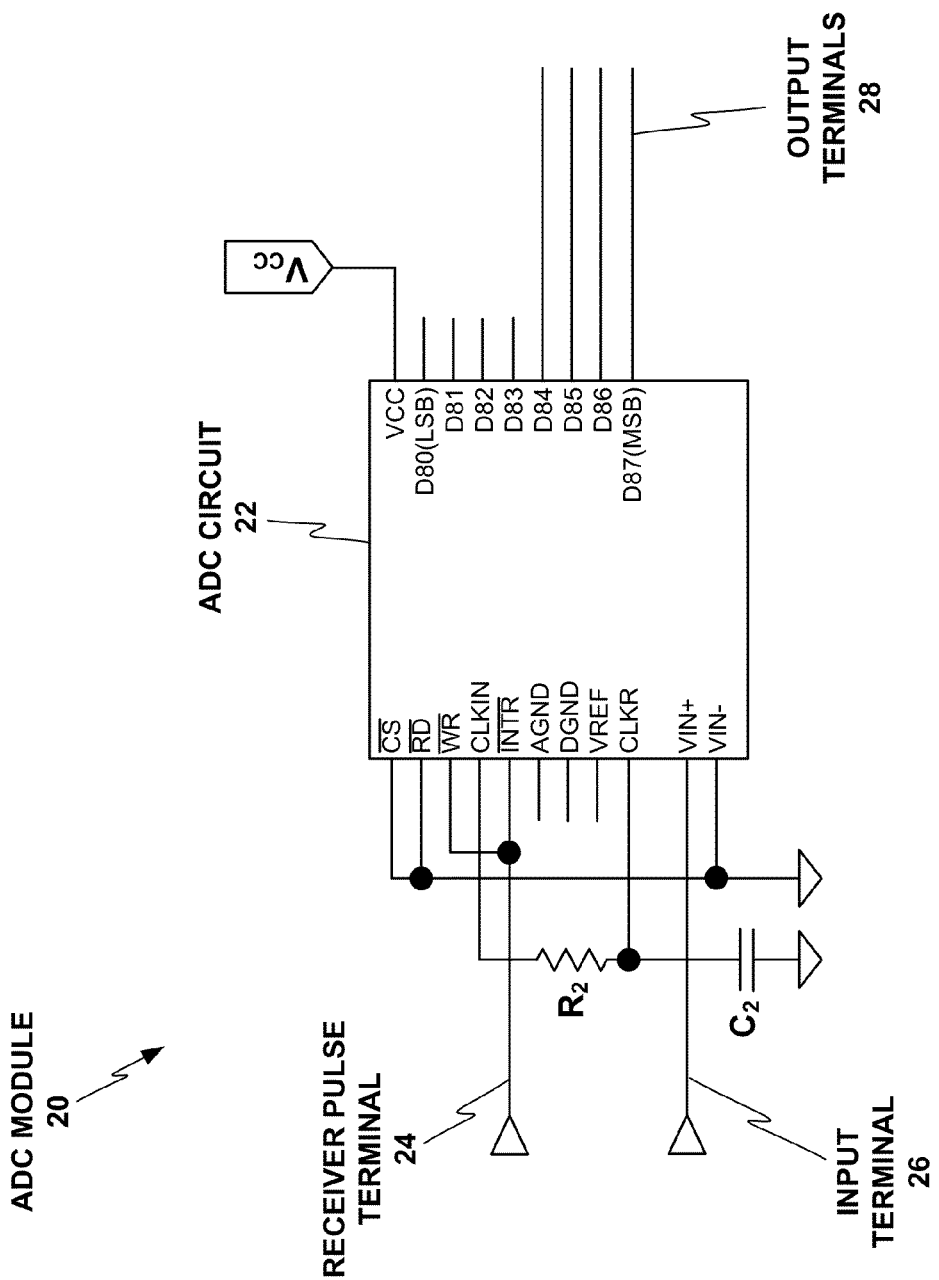
FIG. 3 is a circuit diagram of an example analog-to-digital converter (ADC) module.

FIG. 3 is a circuit diagram of analog-to-digital (ADC) module 20, which receives the linearized thermistor data from linearization module 10 of FIG. 1. ADC module 20 includes an analog-to-digital converter (ADC) circuit 22. ADC module 20 generates a digital output based on the linearized temperature data, which ADC module 20 then sends to digital magnitude comparator module 31.

ADC circuit 22 may be operatively configured to receive a linearized analog temperature signal from linearization module 10 and to convert the linearized analog temperature signal into a digital signal. ADC circuit 22 receives the voltage output from linearization module 10 via input terminal 26, which may be directly connected to voltage output terminal 12 of linearization module 10. ADC circuit 22 also receives pulsed input via receiver pulse terminal 24 for writing the linearized analog data to ADC. ADC circuit 22 also has clock inputs generated by a resistor $R_2$ and a capacitor $C_2$, in this implementation. Resistor $R_2$ may have a resistance of 10.0 kilohms and capacitor $C_2$ may have a capacitance of 150 picofarads, in this example. ADC circuit 22 generates a digital output via output terminals 28 based on the voltage output that ADC circuit 22 receives from linearization module 10.

In this illustrative example, ADC circuit 22 generates a 4-bit output on the four output terminals 28. In other implementations, ADC circuit 22 may generate an output that is 8-bit, 10-bit, or 12-bit, among various examples, depending on the desired accuracy and resolution.

Figure 4:
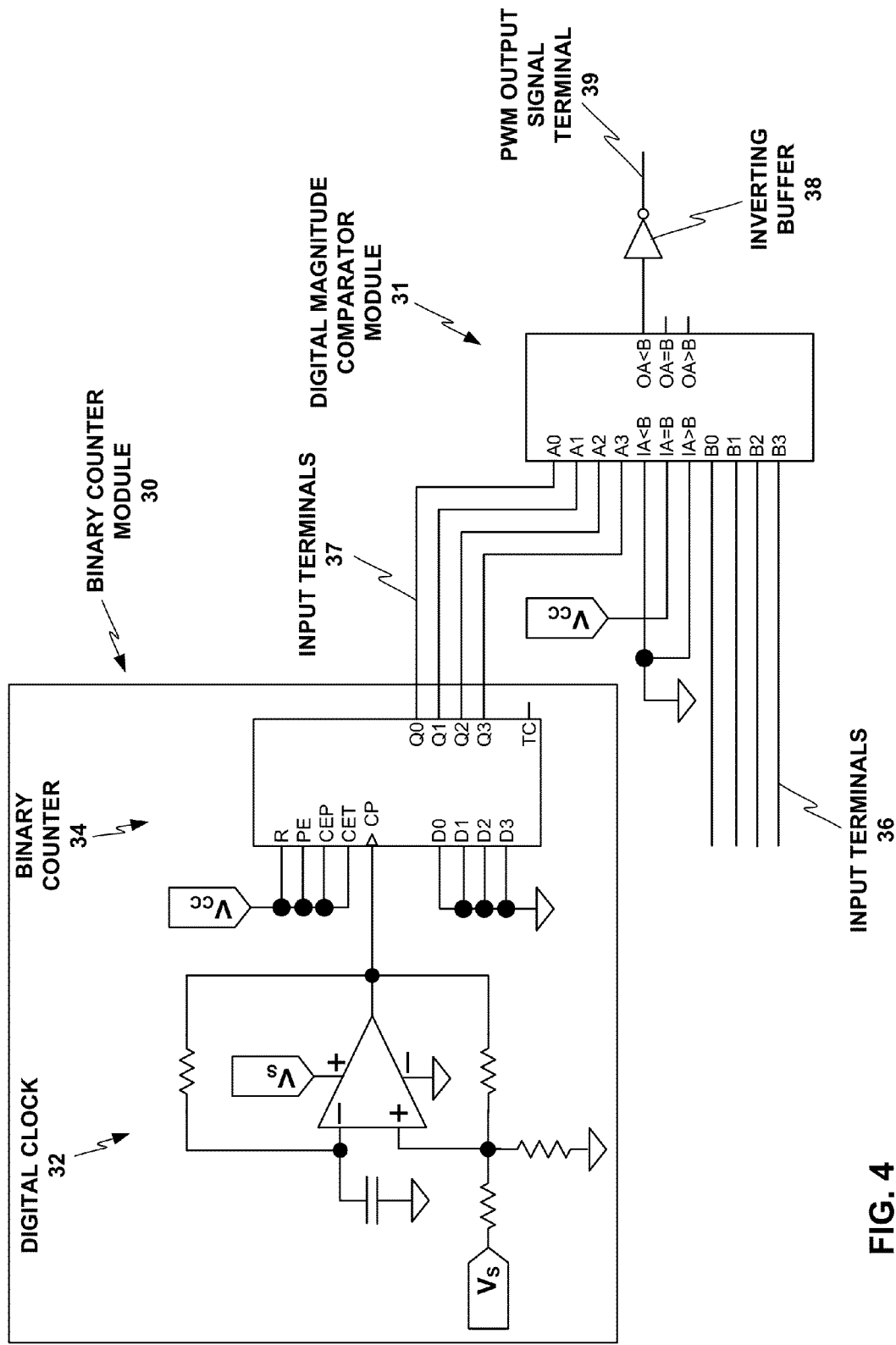
FIG. 4 is a circuit diagram of an example digital magnitude comparator module.

FIG. 4 is a circuit diagram of binary counter module 30 and digital magnitude comparator module 31. Digital magnitude comparator module 31 receives the output from ADC circuit 22 via a first set of input terminals 36. Binary counter module 30 also includes a binary counter 34 which counts the output based on digital clock 32. Digital magnitude comparator circuit 31 receives the digital output based on the linearized thermistor data from ADC module 20 of FIG. 3, and compares the digital output from ADC module 20 with the output of binary counter 34. Digital magnitude comparator module 31 includes a first set of input terminals 36 and a second set of input terminals 37, wherein the first set of input terminals 36 are connected to the output of the ADC module 20, and the second set of input terminals 37 are connected to the output of the binary counter 34. An inverting buffer 38 is a part of the digital magnitude comparator module 31, in this example. Digital magnitude comparator module 31 compares digital data from binary counter 34 and from ADC circuit 22 and generates a PWM output based on the output from ADC circuit 22, and ultimately based on the original analog temperature data output from the thermistor 8.

Digital magnitude comparator module 31 may define a "Greater Than" output that goes from low to high when the counter value of binary counter 34 exceeds the output received from ADC circuit 22 of ADC module 20. In this way, digital magnitude comparator module 31 generates a PWM output with a duty cycle that varies with the sensed temperature data. The duty cycle may be set to vary over the selected voltage range corresponding to the selected temperature range as linearized by linearization module 10, such that the duty cycle goes to 0% at the bottom of the selected temperature range, and goes to 100% at the top of the selected temperature range, as further described below.

Binary counter 34 receives a clock signal from digital clock 32. Digital clock 32 may operate at approximately 100 kilohertz (kHz) in this example. The resulting frequency of the PWM signal is sixteen times less than this counter clock frequency, since it requires sixteen pulses to complete one revolution of binary counter 34. Digital magnitude comparator module 31 thereby generates a PWM output based on the digital output from ADC module 20.

In this example, digital magnitude comparator module 31 and binary counter 34 are implemented as a 4-bit magnitude comparator and a 4-bit binary counter respectively, but these can also be matched to the number of bits of the ADC circuit 22 in other implementations, such as 8-bit, 10-bit, 12-bit, or other implementation. The digital magnitude comparator module 31 may be implemented as a 74HC85A integrated circuit in this example. The binary counter 34 may also be implemented as a 74HC161 integrated circuit in this example.

Figure 5:
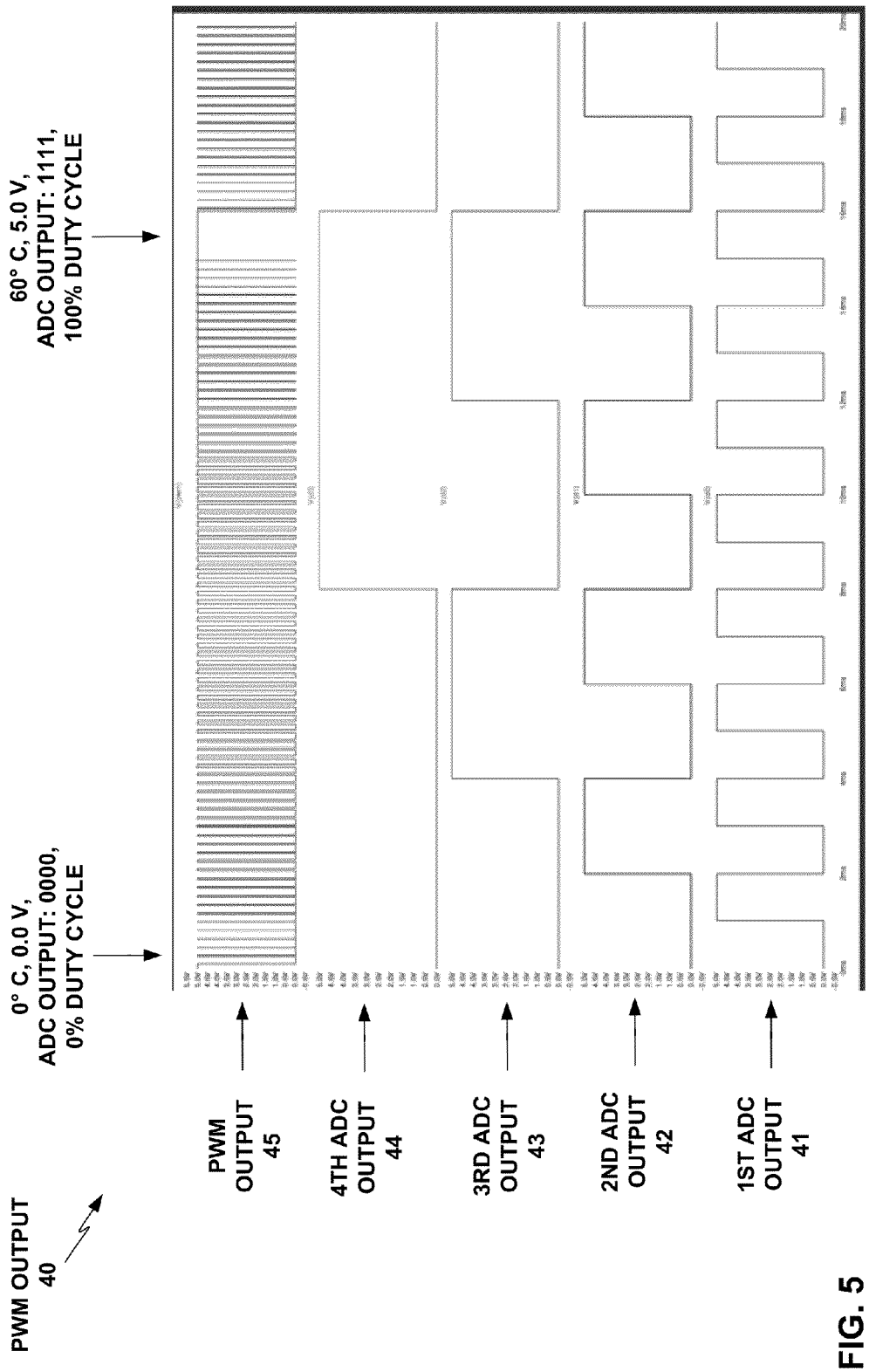
FIG. 5 is an illustrative view depicting an example graph of a digital PWM output from a pulse width modulation (PWM) output digital temperature sensor in accordance with an illustrative embodiment.

FIG. 5 is a PWM output graph 40 depicting an illustrative example of ADC digital signal outputs on the output terminals 28 of ADC module 20 as received via input terminals 36 of digital magnitude comparator module 31, in relation to a corresponding digital PWM output signal that digital magnitude comparator module 31 may generate as a PWM output signal at terminal 39. The four ADC outputs on ADC output terminals 28 and on input terminals 36 are shown at 41-44 respectively, with the PWM output from digital magnitude comparator module 31 shown at 45.

Each of the ADC outputs and the PWM output range between a low of 0.0 V and a high of 5.0 V in this example. The values are shown ranging from 0.0 V for all four ADC outputs and 0.0 V for the PWM output, to 5.0 V for all four ADC outputs and 5.0 V for the PWM output. The outputs of 0.0 V for all four ADC outputs correspond to a digital signal of "0000" on the ADC output terminals 28 in FIG. 3. As shown in FIG. 5, a digital signal of "0000" results in 0.0 V for the PWM output on PWM output signal terminal 39, and corresponds to a temperature input of 0° C. from thermistor 8 and to a 0% duty cycle, in this example. At the other end of the selected temperature range, the outputs of 5.0 V for all four ADC outputs correspond to a digital signal of "1111" on the ADC output terminals 28 in FIG. 3. As shown in FIG. 5, a digital signal of "1111" results in 5.0 V for the PWM output correspond to a temperature input of 60° C. from thermistor 8, and to a 100% duty cycle, in this example.

The PWM output 45, and the resulting duty cycle, may vary linearly between 0-100%, as a function of the ADC outputs 41-44, and therefore ultimately as a function of the temperature reading at thermistor 8. For any temperature reading below the lower end of the selected range, in this case below 0° C., the PWM output on PWM output signal terminal 39 remains at a steady 0.0 V, and the duty cycle remains at 0%. In an analogous manner, for any temperature reading above the upper end of the selected range, in this case above 60° C., the PWM output on PWM output signal terminal 39 remains at a steady 5.0 V, and the duty cycle remains at 100%. Any other temperature range may also be selected in other embodiments with a suitable implementation of linearization module 10, and any other degree of resolution of the resulting duty cycle within the selected temperature range may also be selected in other embodiments with a suitable implementation of ADC module 20 and in particular ADC circuit 22.

The digital magnitude comparator circuit 31 may be calibrated to vary between a 0% duty cycle corresponding to a minimum temperature of the selected temperature range and a 100% duty cycle corresponding to a maximum temperature of the selected temperature range. The digital comparator circuit is thereby configured to generate an accurate reading of the temperature in the form of a digital PWM output with a duty cycle that corresponds to the temperature. This digital temperature sensor may thereby generate a digital pulse width modulation (PWM) output with high accuracy, without requiring a machine that can execute software and without requiring writing, debugging, and maintaining software.

Figure 6:
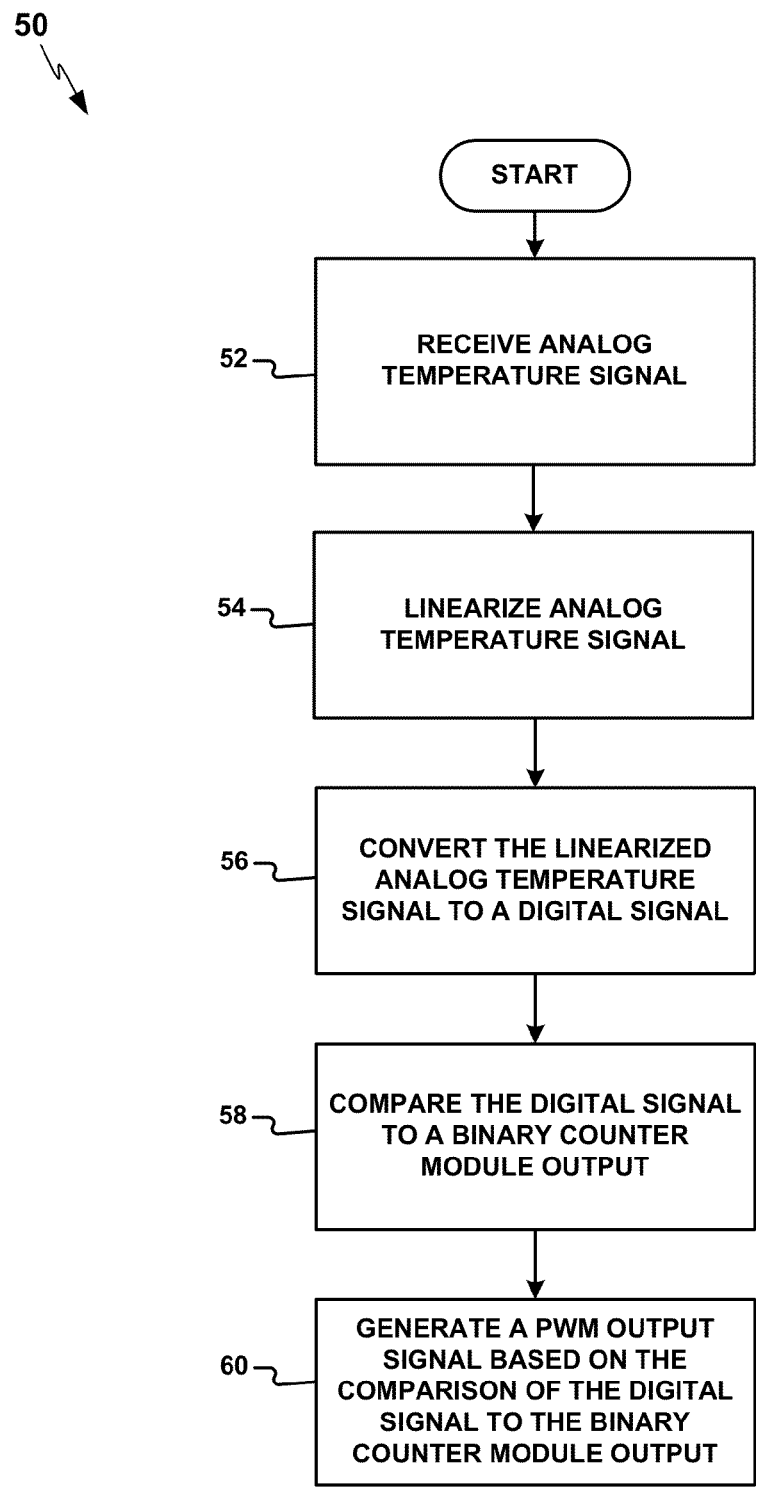
FIG. 6 is a flowchart for a process of generating a digital pulse width modulation temperature signal based on a temperature sensor reading.

FIG. 6 is a flowchart for an example process 50 of generating a digital pulse width modulation temperature signal based on a temperature sensor reading. Process 50 includes receiving an analog temperature signal (52), such as may be done by linearization module 10 from thermistor 8 via temperature sensor input line 9, as shown in FIG. 1. Process 50 further includes linearizing the analog temperature signal (54), such as may be performed by linearization module 10, as shown in FIG. 2 and as described above in reference thereto. The analog temperature signal may correspond to a temperature sensed by thermistor 8 or another temperature sensor connected to temperature sensor input line 9, in other implementations. Linearizing the analog temperature signal may include generating a voltage in a selected voltage range that linearly represents the analog temperature signal within a selected temperature range, as described above with reference to FIGS. 2 and 3.

Process 50 further includes converting the linearized analog temperature signal to a digital signal (56), such as may be performed by ADC module 20, as shown in FIG. 3 and as described above in reference thereto. Converting the linearized analog temperature signal to a digital signal may include generating digital outputs on a plurality of output terminals such as the four output terminals 28 for a 4-bit implementation as in FIG. 3. Other implementations using a variety of bit lines may also be used in other examples, and other types of connections for communicating digital signals may also be implemented.

Process 50 further includes comparing the digital signal to a binary counter module output (58), where a binary counter module 30 may generate the binary counter module output, and the digital magnitude comparator 31 may perform the comparing of the digital signal to the binary counter module output, as shown in FIG. 4 and as described above in reference thereto. Process 50 additionally includes generating a pulse width modulation (PWM) output signal based on the comparison of the digital signal to the binary counter module output (58), such as may be performed by digital magnitude comparator module 31 as shown in FIG. 4 and as described above in reference to both FIGS. 4 and 5.

Generating the PWM output signal may include comparing the plurality of digital outputs from ADC module 20 with a plurality of outputs from binary counter module 34 from the output of the binary counter 34 based on the clock signal from digital clock 32. Generating the PWM output signal may be implemented by generating a digital pulse width modulation signal based on the comparing of the plurality of digital outputs with the plurality of outputs from the binary counter.

Because PWM output temperature sensor device 1 may rapidly and accurately generate a pulse width modulation output as a function of a temperature reading, PWM output temperature sensor device 1 may be used advantageously in a variety of applications. For example, PWM output temperature sensor device 1 may be incorporated in a temperature control system, in which the pulse width modulation output at PWM output signal terminal 39 is used as an input to a compressor or other element of a cooling system. As the temperature sensed by thermistor 8 increases within the selected temperature range, PWM output temperature sensor device 1 increases the duty cycle of the PWM output at PWM output signal terminal 39. Similarly, as the temperature sensed by thermistor 8 decreases within the selected temperature range, digital temperature sensor PWM device 1 decreases the duty cycle of the PWM output at PWM output signal terminal 39.

PWM output temperature sensor device 1 may thereby be able to generate an automatic, rapid, accurate temperature control signal, and in a robust manner with low-cost requirements to implement and to maintain. PWM output temperature sensor device 1 may perform with better accuracy than analog systems, while also doing so without imposing the requirements, costs, and maintenance necessary for a system based on a processor executing software code, in various examples.

Although certain illustrative examples and applications have been described in detail above, other modifications or examples are possible consistent with this disclosure. Other steps may be implemented, or steps may be eliminated, from the described flow diagram, and other components may be added to, or removed from, the described systems. Various other embodiments may be comprehended within the scope of the following claims.

What is claimed is:

1. A pulse width modulation output temperature sensor device comprising:
   a linearization module configured to receive a temperature signal from a thermistor and to generate a linear output based on the temperature signal;
   an analog-to-digital converter module configured to receive the output from the linearization module and to generate a digital signal based on an analog-to-digital conversion of the output from the linearization module; and
   a digital magnitude comparator module configured to receive the digital signal from the analog-to-digital converter module and to generate a digital pulse width modulation output signal based on a comparison of the digital signal from the analog-to-digital converter module to a binary counter module output,
   wherein the generated digital pulse width modulation output signal comprises a first electrical state and a second electrical state, the generated digital pulse width modulation output signal being in the first state when the received digital signal from the analog-to-digital converter module is less than the binary counter module output, and the generated digital pulse width modulation output signal being in the second electrical state when the received digital signal from the analog-to-digital converter module is greater than the binary counter module output.

2. The pulse width modulation output temperature sensor device of claim 1, wherein the linearization module comprises:
   a thermistor;
   an output terminal; and
   a linearization circuit comprising one or more operational amplifiers and a plurality of resistors connected between the thermistor and the output terminal, wherein the linearization circuit is configured to generate a voltage in at the output line that linearly represents a temperature signal corresponding to a selected temperature range received at the temperature sensor input line.

3. The pulse width modulation output temperature sensor device of claim 1, wherein the analog-to-digital converter module comprises an analog-to-digital converter, wherein an input terminal of the analog-to-digital converter is connected to an output terminal of the linearization module, and an output terminal of the analog-to-digital converter is connected to an input terminal of the digital magnitude comparator module.

4. The pulse width modulation output temperature sensor device of claim 1, wherein the binary counter module comprises:
   a digital clock configured to generate the digital clock signal;
   a binary counter with an input connected to the digital clock; and
   a digital magnitude comparator module with a first set of input terminals and a second set of input terminals, wherein the first set of input terminals are connected to an output of the analog-to-digital converter module, and the second set of input terminals are connected to an output of the binary counter,
   wherein the digital magnitude comparator circuit has an output terminal configured to generate the digital pulse width modulation output signal.

5. A method of generating a digital output signal based on a temperature reading, the method comprising:
   receiving an analog temperature signal based on a temperature reading;
   linearizing the analog temperature signal;
   converting the linearized analog temperature signal to a digital signal;
   comparing the digital signal to a binary counter module output; and
   generating a pulse width modulation output signal based on the comparison of the digital signal to the binary counter module output, wherein the pulse width modulation output signal is thereby based on the temperature reading,.
   wherein the generated pulse width modulation output signal comprises a first electrical state and a second electrical state, the generated pulse width modulation output signal being in the first state when the received digital signal from the analog-to-digital converter module is less than the binary counter module output, and the generated pulse width modulation output signal being in the second electrical state when the received digital signal from the analog-to-digital converter module is greater than the binary counter module output.

6. The method of claim 5, wherein the analog temperature signal corresponds to a temperature sensed by a temperature sensor, and wherein linearizing the analog temperature signal comprises generating a voltage that linearly represents the analog temperature signal within a selected temperature range.

7. The method of claim 5, wherein converting the linearized analog temperature signal to a digital signal comprises generating digital outputs on a plurality of output terminals.

8. The method of claim 5, wherein the digital signal comprises a plurality of digital outputs, and wherein generating the pulse width modulation output signal comprises comparing the plurality of digital outputs with a plurality of outputs from a binary counter based on a clock signal; and wherein generating the pulse width modulation output signal is based on the comparing of the plurality of digital outputs with the plurality of outputs from the binary counter.

* * * * *